(12) United States Patent
Wedde et al.

(10) Patent No.: US 8,894,921 B2
(45) Date of Patent: Nov. 25, 2014

(54) FLUE GAS COOLING AND CLEANING SYSTEM

(75) Inventors: Geir Wedde, Oslo (NO); Ole K. Bockman, Oslo (NO)

(73) Assignee: ALSTOM Technology Ltd., Baden (CH)

( * ) Notice: Subject to any disclaimer, the term of this patent is extended or adjusted under 35 U.S.C. 154(b) by 360 days.

(21) Appl. No.: 12/529,355

(22) PCT Filed: Mar. 12, 2008

(86) PCT No.: PCT/EP2008/001953
§ 371 (c)(1), (2), (4) Date: Sep. 1, 2009

(87) PCT Pub. No.: WO2008/113496
PCT Pub. Date: Sep. 25, 2008

(65) Prior Publication Data
US 2010/0101760 A1  Apr. 29, 2010

(30) Foreign Application Priority Data
Mar. 22, 2007  (GB) .................................. 0705439.8

(51) Int. Cl.
*C22B 5/04*  (2006.01)
*F28D 7/10*  (2006.01)

(52) U.S. Cl.
USPC .................. 266/191; 165/104.19; 165/104.28

(58) Field of Classification Search
USPC ......................... 266/191; 165/104.19, 104.28
See application file for complete search history.

(56) References Cited

U.S. PATENT DOCUMENTS 4,332,294 A * 6/1982 Drefahl et al. ................. 165/157
5,246,063 A * 9/1993 Fix et al. ..................... 165/134.1

FOREIGN PATENT DOCUMENTS

| CN | 1317361 | 10/2001 |
|---|---|---|
| DE | 2 103 794 | 9/1971 |
| EP | 0 105 442 | 4/1984 |
| EP | 0 246 111 | 11/1987 |
| GB | 1 140 222 | 1/1969 |
| GB | 1291847 | 10/1972 |
| JP | 06-147777 | 5/1994 |
| JP | 2002-162021 | 6/2002 |
| WO | WO 2004/035869 | 4/2004 |

OTHER PUBLICATIONS

PCT International Search Report and The Written Opinion of the International Searching Authority dated Jun. 24, 2008—(PCT/EP2008/001953).
First Substantive Examination Report from the GCC Patent Office as reported Jun. 3, 2013 for GCC Application No. GCC/P/2008/10376.

* cited by examiner

*Primary Examiner* — Lois Zheng

(57) ABSTRACT

An improved flue gas cooler 10, or bank of coolers 10, handles flue gas G from aluminum reduction cells in an aluminum smelter plant. Each flue gas cooler 10 has a gas inlet chamber 14, a gas outlet chamber 16, and a matrix of gas cooling tubes 18 extending between the inlet chamber and the outlet chamber. Each cooling tube 18 has a bell-shaped inlet end 19 comprising an aerodynamically curved gas-accelerating profile effective to facilitate streamlined flow of flue gas G into the tube. The improved flue gas cooler makes it possible to connect the flue gas cooler to receive flue gas G direct from the aluminum reduction cells without getting clogged by dust and sublimates present in the flue gas.

11 Claims, 2 Drawing Sheets

FLUE GAS COOLING AND CLEANING SYSTEM

FIELD OF THE INVENTION

The present invention relates to an improved gas cooler for cooling flue gas from aluminium smelters. It further relates to an improved flue gas cooling and cleaning system for an aluminium smelter plant, and a system for extracting heat energy from the flue gas.

BACKGROUND OF THE INVENTION

Aluminium smelters, comprising many aluminium reduction cells (colloquially called "pots"), produce large amounts of hot flue gas containing hydrogen fluoride, other gases, particulates, and sublimates. For example, an aluminium smelter producing 300,000 tonnes/year of aluminium metal will comprise about 400 reduction cells, arranged in four rows. Such a potline will produce about 3,600,000 Normal cubic meters per hour ($Nm^3/h$) of flue gas. The raw flue gas must be cleaned, and a well-known type of gas cleaning process used in this connection is the so-called "dry scrubbing" process. Gas cleaning plant using this process is available, for example, from ALSTOM Power Environment Control Systems at Drammensveien 165, 0277 Oslo, Norway (Tel. +47 22 12 70 00).

The trend of technical development in the aluminium production industry is toward the hooded pre-bake type of reduction cells. These are increasing in size and energy input, resulting in increasing flue gas temperatures. From a previous level of 70-90° C., the flue gas temperature from the most modern potlines is now in the range 120-180° C., or even more. Unfortunately, such flue gas temperatures exceed acceptable temperature levels for gas cleaning plant using the dry scrubbing process, with regard to both the process and the equipment. Consequently, the dust- and impurity-containing raw flue gas has to be cooled before it enters the cleaning plant.

It is known to cool hot raw flue gas produced by aluminium reduction cells by mixing cool ambient air into the flue gas ducts upstream of a gas cleaning plant. Gas/air mixing is easy and cheap, but when gas temperatures are up to or exceeding 150° C., the volume of ambient air required to give adequate cooling becomes substantial, and so does the increase in cooled gas volume. Hence, there is a corresponding increase in the size of the gas cleaning plant, the downstream fans that pull the gas through the cleaning plant, and the plant energy consumption. This adversely affects the plant economics, both during its construction and during its operation.

It is also known to cool the flue gas from aluminium reduction cells by evaporation using direct injection of atomised water. Although this system reduces the overall flue gas volume, the volume of steam thereby produced must also be taken into account. Direct cost for this cooling system is moderate, but it requires large quantities of compressed air for atomisation of the injected water, so energy consumption for air compression is high. Furthermore, the system requires quite large quantities of fresh, purified cooling water, which is an economic and environmental disadvantage in areas where fresh clean water is a valuable asset. Additionally, assuming filter bags are used in the subsequent gas cleaning plant, high humidity in the cooled flue gas may hydrolyse the standard polyester type of filter bag, necessitating use of a more chemically inert and very considerably more expensive material for the filter bags.

In some existing aluminium smelting plants, it is known to recover heat from the flue gas after it has been cleaned by passing it through heat exchangers to produce warm water for heating purposes. Hitherto, such heat recovery has only been possible after the gas has been cleaned, because dust, sublimates and other impurities in raw flue gases would otherwise tend to deposit as hard scale onto heat exchanger surfaces, resulting in clogging and reduced heat transmission in the heat exchanger. Moreover, at present the building of new or larger aluminium smelting capacity is mainly limited to tropical or subtropical countries, in which the energy requirement for heating purposes is limited or non-existent, the greater need usually being energy for cooling purposes.

It is known to use the gas tube type of gas cooler to cool hot flue gases from steel, ferro-silicon and silicon metal furnaces. In such coolers, the flue gas—which comes from the furnace to the cooler via flue ducting—flows through a bundle of parallel tubes, with the coolant flowing over the outside of the tubes. The fumes and particulates in these gases tend to form insulating layers of dust on the cooler tube walls that reduce the heat transmission in the coolers. This type of dust layer can be blown down to an acceptable thickness and can be nearly completely removed by maintaining a high gas velocity along the tubes, thus maintaining an acceptable heat transmission in the coolers.

The fumes and particulates in the flue gas from aluminium reduction bells have, in contrast to the fumes and particulates in the above-mentioned furnace gases, a strong tendency to form hard-as-stone scales when impacting surfaces in turbulent gas flow zones, and surfaces that lie across the gas flow. These scales are too hard and compact to be blown away and removed by any practical gas velocity in tubes or other parts of a gas transportation system. Besides having an insulating effect in a gas cooler, such scaling tends to continue to grow on impact surfaces and in zones of turbulence until the cooler is completely clogged.

It will therefore be understood that the above-mentioned gas tube type of gas cooler, in the form used to cool hot flue gases from metal furnaces, is unsuitable for use in cleaning flue gas from aluminium reduction cells.

SUMMARY OF THE INVENTION

According to one aspect of the present invention, a gas cooler capable of handling hot, raw flue gas from aluminium reduction cells in an aluminium smelter plant comprises:
  (a) a gas inlet chamber;
  (b) a gas outlet chamber; and
  (c) a plurality of gas cooling tubes, each cooling tube having an inlet end in the inlet chamber and an outlet end in the outlet chamber, the inlet ends being bell-shaped and comprising an aerodynamically curved gas-accelerating profile effective to facilitate streamlined flow of hot, raw flue gas into the tubes.

By raw flue gas is meant flue gas that issues untreated from the aluminium smelter pot line, containing hydrogen fluoride, dust, sublimates and other impurities.

The bell-shaped inlets of the cooling tubes are designed to smoothly accelerate the flow of flue gas into the tubes, thereby substantially preventing scale formation inside the tubes. That is to say, the above-mentioned bell-shaped, aerodynamically curved acceleration zone at the inlet of each cooling tube encourages streamlined flow acceleration and prevents flow contraction (the vena contracta effect). In the absence of such preventative measures, turbulent flow would cause impact of the flue gas with the internal surfaces of the cooling tubes, leading to scaling. Our best estimate is that the accelerated gas velocity in the cooling tubes of a preferred embodiment should be in the range of roughly 20-30 m/sec, depending on gas temperature.

Preferably, the cooling tubes form a matrix of mutually parallel, spaced-apart tubes. The cooling tubes should be evenly spaced apart over the cross-sectional extents of the inlet and outlet plenum chambers and their inlet and outlet ends should project into the inlet and outlet plenum chambers, respectively.

The gas cooler should include a coolant enclosure or jacket around the cooling tubes, the enclosure being provided with coolant entry and exit ducts. Conveniently, the coolant enclosure forms part of an external shell of the gas cooler. Preferably, the coolant is water or other appropriate liquid. To maximise heat exchange efficiency, the direction of coolant flow through the coolant enclosure over the outside surfaces of the tubes should be counter to the direction of gas flow through the tubes.

In operation, the inlet chamber is connected to inlet flue ducting that transports the hot flue gas from the aluminium reduction cells to the gas cooler, whereas the outlet chamber is connected to outlet flue ducting that transports the cooled flue gas away from the gas cooler to gas cleaning plant.

The inlet chamber receives the hot, raw flue gas via a diffusing divergent inlet portion, which slows the flue gas entering from the inlet ducting to a relatively low velocity so that it is stabilised and flows evenly into the array of bell-shaped inlets of the cooling tubes. The relative cross-sectional flow areas of the inlet plenum chamber and the array of cooling tubes are judiciously chosen so that the diffusing portion of the inlet plenum chamber slows the hot flue gas to a relatively low velocity, without creating zones of turbulence that would cause unacceptable scaling in the inlet plenum. Our best estimate is that the gas velocity in the inlet plenum chamber should be in the range of roughly 8-12 m/sec, depending on gas temperature. The outlet plenum chamber receives the cooled flue gas from the outlet ends of the cooling tubes, gradually accelerates it through a convergent outlet portion, and discharges it to the flue ducting.

Preferably, the inlet and outlet plenum chambers are demountable from the cooling jacket portion of the gas cooler. This has the advantage of allowing easy disassembly and cleaning of the plenum chambers and the entry and exit portions of the cooling tubes, should this become necessary. However, the need for such cleaning is minimised because of the above-mentioned measures taken to avoid turbulence.

In another aspect of the invention, a flue gas cooling and cleaning system for an aluminium smelter plant includes in flow sequence:

a plurality of aluminium reduction cells that in operation discharge hot, raw flue gas;

at least one flue gas cooler in the form of a gas tube heat exchanger comprising a plurality of cooling tubes, each cooling tube having a longitudinally extending major axis and being configured to receive and pass flue gas therethrough in a streamlined flow whose velocity vectors are substantially parallel to the tube's major axis; and flue gas cleaning plant of the dry scrubbing type;

the at least one flue gas cooler being connected to receive hot, raw flue gas from the reduction cells and to pass cooled raw flue gas to the flue gas cleaning plant.

It is envisaged that the flue gas cooler will receive raw flue gases at a temperature in the range 120-250° C. and deliver them to the flue gas cleaning plant at a temperature in the range 60-120° C. The latter temperature range suits a flue gas cleaning plant of the dry scrubbing type.

Cooling of the flue gas before it enters the flue gas cleaning plant is advantageous because the flue gas exiting the reduction cells is at temperatures that exceed the capabilities of the dry scrubbing plant. To achieve the required cooling of the flue gas, we utilise a coolant jacket around the cooling tubes of the flue gas cooler as part of a closed circuit coolant circulation system that couples the flue gas cooler to a heat exchange arrangement that extracts heat energy from the coolant and rejects it to the environment and/or passes it to further plant. Preferably, the closed circuit coolant circulation system flows the coolant through the coolant jacket in a direction counter to the flow of flue gas through the cooling tubes. It is convenient if the coolant in the closed circuit coolant circulation system is water.

Cooling of the hot, raw flue gases before they are passed to the dry scrubbing plant will be environmentally advantageous, because such cooling will improve the adsorption efficiency of the scrubbing media, thereby improving the efficiency of recovery of hydrogen fluoride from the flue gases and so reducing harmful emissions. Additionally, flue gas cooling prior to the gas cleaning process will extend the life of filter bags used in the dry scrubbing process.

A further efficiency advantage may arise, in that cooling of the flue gases before entry to the gas cleaning process may allow the potline operators to increase potline amperage without detrimental effect on the gas cleaning process.

An aluminium smelter may have a large number of reduction cells, and to handle the large volumetric flow rate of the resulting flue gas, we prefer that a plurality of flue gas coolers are connected in parallel with each other to receive flue gas from the reduction cells. For example, each such flue gas cooler may receive flue gas from between about 50 to about 100 reduction cells.

In a further aspect, the invention provides a method of cooling and cleaning raw flue gas from an aluminium smelter plant provided with flue gas cleaning plant of the dry scrubbing type, comprising the steps of:

(a) passing the raw flue gas at an initial temperature in excess of that compatible with the flue gas cleaning plant through a plurality of gas coolers arranged to receive the raw flue gas in parallel with each other, the gas coolers comprising an array of cooling tubes configured to receive and pass the raw flue gas therethrough in a streamlined flow;

(b) flowing coolant on the outside of the cooling tubes to cool the raw flue gas by transfer of flue gas heat to the coolant, thereby cooling the flue gas to a temperature compatible with the flue gas cleaning plant; and (c) passing the cooled raw flue gas to the flue gas cleaning plant.

Heat energy may be extracted from the coolant by a heat exchange arrangement and used to increase the efficiency of further plant coupled to the heat exchange arrangement.

In yet another aspect of the invention, an aluminium smelter plant is provided with a flue gas cooling system, the system comprising:

at least one flue gas cooler in the form of a gas tube heat exchanger comprising a plurality of cooling tubes, each cooling tube having a longitudinally extending major axis and being configured to receive and pass raw flue gas therethrough in a streamlined flow whose velocity vectors are substantially parallel to the tube's major axis; and a coolant circulation system that flows coolant over the outside of the cooling tubes.

We prefer that the coolant circulation system is a closed circuit coolant circulation system and that a heat exchange arrangement is coupled to the flue gas coolers through the closed circuit coolant circulation system to cool the coolant. The heat exchange arrangement may cool the coolant by rejecting heat to the environment and/or exchanging heat with further plant. Thus, the heat exchange arrangement can in turn be coupled to further plant through a further closed circuit coolant circulation system and heat energy extracted from the coolant by the heat exchange arrangement can then be used to increase the efficiency of the further plant. Such further plant may comprise at least one of the following:
   a combined cycle power plant (for example, a pre-heater for boiler water);
   a desalination plant;
   a district heating scheme.

Further aspects of the invention will be apparent from a perusal of the following description and claims.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

It should be understood that the accompanying Figures illustrate purely exemplary embodiments of the invention. Each feature or system parameter shown in the Figures or described below would be subject to variation during detailed design of a system to fit the needs of a particular aluminium smelter potline.

Figure 1:
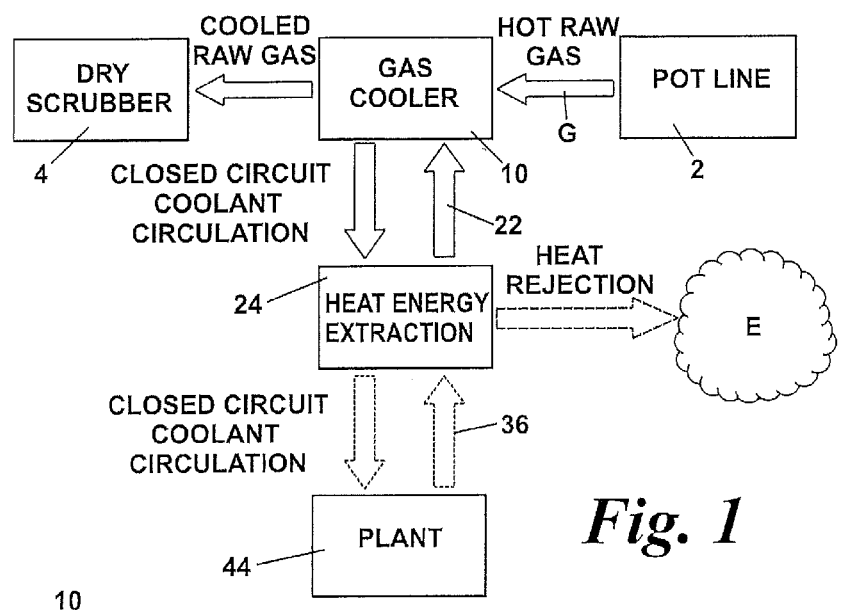
FIG. 1 is a block diagram of part of an aluminium smelter plant constructed in accordance with the invention.

In FIG. 1, an aluminium smelter potline 2 produces hot, particulate- and sublimate-laden flue gas G. This hot raw flue gas is passed through a gas cooler 10, which cools the flue gas before it is passed through a flue gas cleaning plant 4 of the dry scrubbing type. In the gas cooler 10, heat is taken away from the hot raw flue gas G by coolant 22. It would be possible to use environmental water as coolant 22 to directly cool the flue gas G by means of an open-circuit coolant circulation system. However, as shown, it is preferable to cool the coolant 22 by extracting the heat energy from it in a heat exchange arrangement 24 that is coupled to the gas cooler 10 through a closed-circuit coolant circulation system. The heat exchange arrangement 24 may then cool the coolant by rejecting heat to the environment E, and/or by heat exchange with further plant 44 through a further closed-circuit coolant circulation system, as explained below.

Figure 2:
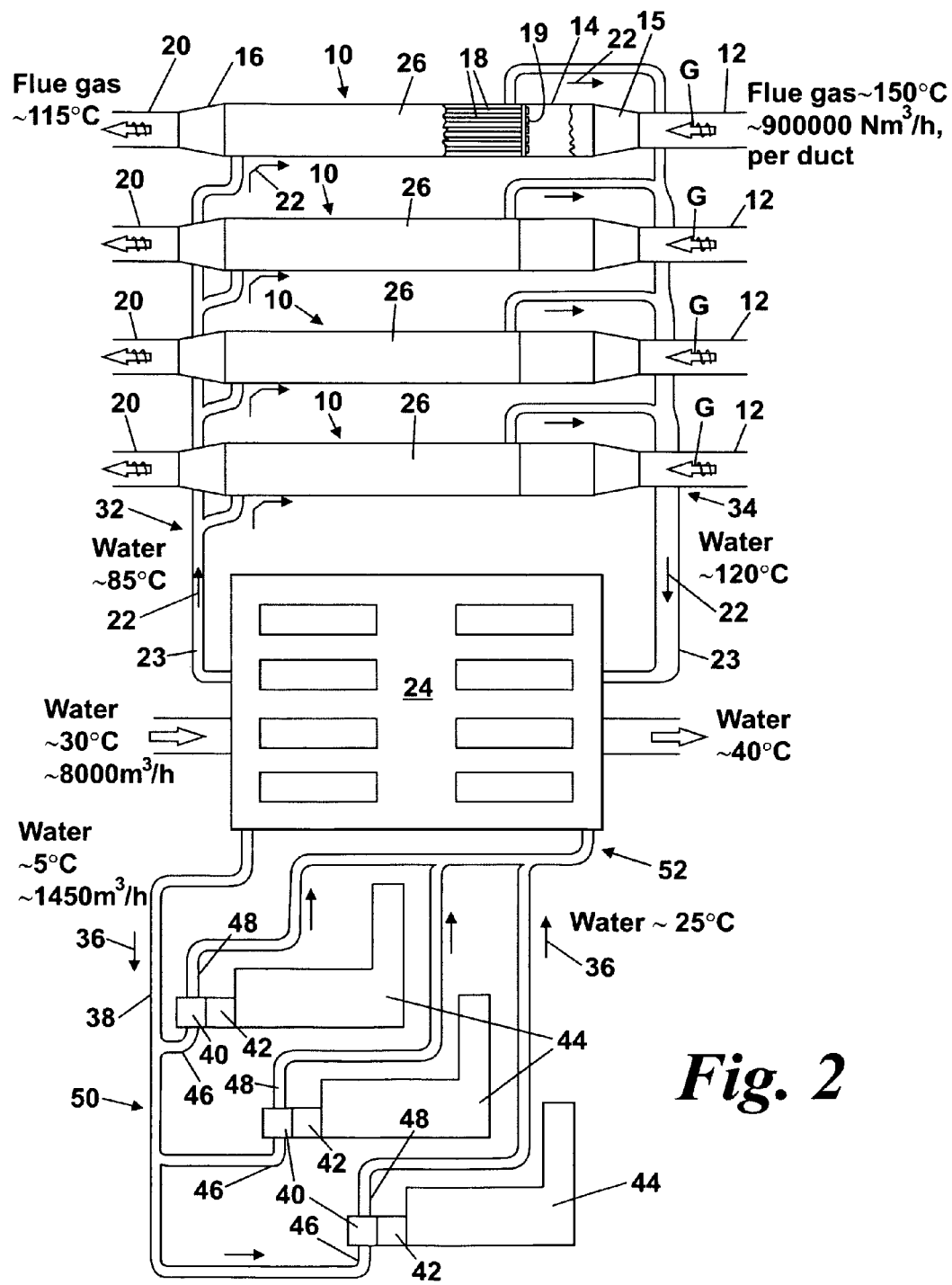
FIG. 2 is a schematic diagram of the flue gas cooling system used in FIG. 1.

Turning now to FIG. 2, hot raw flue gas is collected from the smelter potline by flue ducting comprising, in this embodiment, four main flue gas header ducts 12. Assuming a smelter of capacity 300,000 tonnes of aluminium per year, the potline will produce about 3,600,000 Nm³/h of flue gas G. Each duct 12 will therefore handle about 900,000 Nm³/h of flue gas G. Each header duct 12 is about 5-6 m diameter and in this instance is shown as having its own gas cooler 10. As explained below, each gas cooler comprises a gas tube type of heat exchanger that is specially adapted to handle the hot raw flue gas.

Each gas cooler 10 has an inlet plenum chamber 14 to slow down and stabilise the hot flue gas received from the corresponding header duct 12, and an outlet plenum chamber 16 to discharge the cooled flue gas to continuations 20 of the flue gas header ducts. The inlet plenum chambers 14 are about 6-7 m. diameter, and each has a diffusing divergent inlet portion 15 that slows the flue gas G without substantial turbulence to a relatively low velocity of about 8-12 m/sec. The outlet plenum chambers 16 have a convergent contracting profile to increase the velocity of the cooled flue gas G into the flue ducts 20. Cooling of the flue gas G is effected by transferring heat from the flue gas to cooling water 22 (or other coolant) circulating in a closed loop system that is pressurised to about 2 bar. Pumps (not shown), circulate the coolant through ducts 23 that connect a heat exchanger arrangement 24 (examples of which are described below) to a coolant enclosure or jacket 26 that forms part of an outer shell or casing for each gas cooler 10. The coolant jackets 26 are connected into the cooling system in parallel with each other, their entries 28 and exits 30 being connected to the "cool" and "hot" legs 32, 34, respectively, of the cooling system.

In this embodiment, the gas coolers 10 reduce the flue gas temperature from about 150° C. at their entries 14, to about 115° C. at their exits 16. At the latter temperature, the flue gas has cooled sufficiently for entry to a gas cleaning plant of the dry scrubbing type previously mentioned. Meanwhile, the temperature of cooling water 22 has been increased from about 85° C. at its exit from the absorption chiller station 24 to about 120° C. at its exit from the cooling jackets 26.

Normally, the gas coolers 10 will be cylindrical, the coolant jackets 26 being of the same diameter as the inlet and outlet plenum chambers 14, 16. Part of the wall of the coolant jacket 26 of the topmost gas cooler 10 in FIG. 2 is shown broken away to reveal a bundle of gas cooling tubes 18 occupying the interior of the gas cooler and connected between the inlet and outlet plenum chambers, 14, 16. There will be many more cooling tubes 18 within each gas cooler 10 than can be illustrated in FIG. 2; about 500-900 tubes (depending on tube diameter), will be equally spaced apart over the cross-sectional areas of the coolant jacket 26 and the inlet and outlet plenum chambers 14, 16. As also indicated in FIG. 2, to maximise efficiency of heat transfer from the flue gas G to the coolant 22, it is arranged that the general direction of flow of coolant through the coolant jackets 26 is counter to the flow of the flue gas G through the heat exchange tubes 18.

For convenience of illustration in FIG. 2, the gas coolers 10 are shown with their major, longitudinally extending axes aligned horizontally. However, in FIG. 3, gas cooler 10 is oriented vertically, this being the preferred orientation for the gas tube type of heat exchanger. Flue gas G enters the cooling tubes 18 at their top ends, while water or other coolant enters the coolant jacket 26 at the bottom end, flows upwards past the cooling tubes 18 to cool them, and exits the jacket at its top end. Circulation of water coolant is aided by the fact that as it heats up by contact with the tubes, it becomes less dense and naturally rises to the top of the vessel.

Because the cooling tubes 18 carry hot raw flue gas direct from the potline, they are carefully aerodynamically designed to control dust deposition and scaling from the flue gas to a minimal amount that maintains effective heat transmission through the walls of cooling tubes 18 into the coolant 22 flowing past them in the coolant jackets 26. In this context, aerodynamic design is such as to maintain the flue gas stream lines or velocity vectors substantially parallel to the walls of the cooling tubes 18, i.e., substantially parallel to their longitudinal axes.

Figure 3:
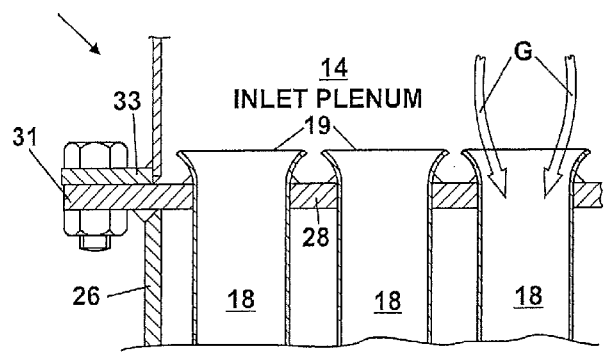
FIG. 3 is a longitudinal section of part of the flue gas cooler of FIG. 2.
Figure 3:
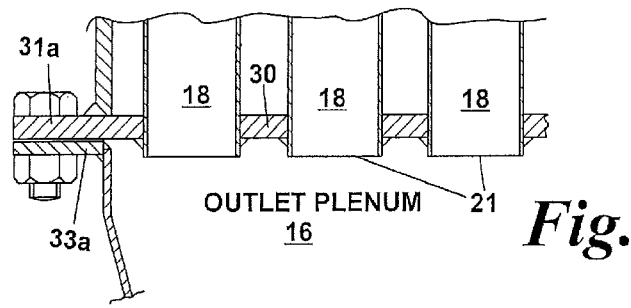

As shown clearly in FIG. 3, each cooling tube 18 has an inlet end 19 that projects into the inlet plenum chamber 14 and an outlet end 21 that projects into the outlet plenum chamber 16. The tube walls are straight, except at their inlet ends 19, each of which comprises an aerodynamically shaped bellmouth converging portion, designed to smoothly accelerate flue gas G into the cooling tubes 18 from the above-mentioned velocity of about 8-12 m/sec in the inlet plenum chamber, to about 20-30 m/sec in the cooling tubes. Maintaining streamline flow into cooling tubes 18, while increasing the flow velocity, avoids turbulence and prevents scale formation on their inside walls.

Dimensions of the cooling tubes 18 to obtain an optimal flue gas velocity will be a compromise between several variables, such as pressure loss, heat exchange efficiency, fouling factors and the overall size of the gas cooler 10. Optimisation will occur during practical tests. In the present embodiment, each cooling tube 18 is about 6.4 meters in diameter and about 20-30 meters long.

It will be noticed from FIG. 2 that the inlet and outlet plenum chambers 14, 16, are demountable from the cooling jacket portion 26 of the gas cooler 10. This is facilitated by providing the cooling jacket portion 26 with end plates 28, 30. End plates 28, 30 not only separate the pressurised coolant jacket portion 26 from the inlet and outlet plenum chambers 14, 16, respectively, but also provide bolting flanges 31, 31a, to interface with similar bolting flanges 33, 33a on the inlet and outlet plenum chambers 14, 16. This construction allows easy disassembly, maintenance and descaling of the plenum chambers, and of the entry and exit portions of the cooling tubes, should this eventually become necessary.

Note that it is not necessary for there to be a one-to-one relationship between header ducts 12 and gas coolers 10, as shown in FIG. 1. It may in fact be preferable to divide the flue gas flow from one header duct 12 into two or more vertically arranged gas coolers 10. This makes it easier to control the flow of the water through the water jackets 26 and would make the size and complexity of each gas cooler 10 more manageable.

The skilled person will contemplate possible operation of the invention over ranges of process parameters. Examples of possible ranges and a preferred reference value for the embodiment described above are given in the Table below.

TABLE

| Parameter | Unit | Range | Reference Value |
|---|---|---|---|
| Flue gas temperature at gas cooler inlet | ° C. | 120-250 | 150 |
| Flue gas temperature at gas cooler outlet | ° C. | 60-120 | 115 |
| Flue gas pressure at cooling tube inlet | Pa | 500-2000 | 1000 |
| Allowable pressure drop across cooling tube | Pa | 500-1500 | 1100 |
| Flue gas velocity in cooling tubes | m/sec | 15-35 | 20-26 |
| Dust load in flue gas | mg/Nm$^3$ | 100-3000 | 500-1000 |
| Water temperature at inlet of water jacket | ° C. | 60-120 | 85 |
| Water temperature at outlet of water jacket | ° C. | 90-150 | 120 |
| Internal water pressure | Bar | 0-4 | 2 |

As illustrated in FIGS. 1 and 2, the flue gas coolers described above are advantageously part of a system for using heat energy from the flue gas, in which a closed circuit coolant circulation system circulates coolant through the flue gas cooler and a heat exchange arrangement 24. Heat energy extracted from the coolant by the heat exchange arrangement 24 may be used to increase the efficiency of further plant coupled to the heat exchange arrangement. Examples of such use of extracted heat energy will now be set forth.

EXAMPLE 1

As previously mentioned, new aluminium smelters tend to be built in tropical or sub-tropical areas of the world. In these areas, electric energy for the reduction cells is produced in gas fired power stations by power blocks comprising gas turbines driving generators. A typical gas turbine used in such a situation is the ALSTOM® GT13 E2M, of 180 MW gross power output, operating on a simple cycle.

A limiting factor for the efficiency and power output of simple cycle gas turbines is the inlet air temperature to the compressor. In tropical areas, they are designed for a compressor air inlet temperature of +35° C. The energy output of a typical simple cycle power block (gas turbine only) can be increased by more than 10% if the compressor inlet air temperature is reduced from 35° C. to 15° C. The above-described gas cooler facilitates provision of such inlet air cooling to power blocks, in that heat recovered from the flue gas by the gas tube heat exchanger can be used as the energy source for an absorption type industrial chiller station comprising the heat exchanger arrangement 24. Such an industrial chiller station can output chilled water, which can be used to reduce compressor inlet air temperatures. It will be recalled that, for the process parameters previously quoted, each gas cooler 10 can cool 900,000 Nm$^3$/h of flue gas from a temperature of 150° C. to a temperature of 115° C. This means that approximately 45 MW of heat energy is removed from the flue gas by the absorption chiller station 24, and in the illustrated arrangement, this energy is used by the chiller station to produce roughly 1450 m$^3$/h of cool water 36 at 5° C. The chilled water 36 is circulated through insulated ducts 38 to heat exchangers 40 (i.e., batteries of air coolers, as well known per se in the power generation industry) located at the intakes 42 of three gas turbine power blocks 44. The heat exchangers 40 are connected to the water cooling system in parallel with each other, their entries 46 and exits 48 being connected to the "cool" and "hot" legs 50, 52, respectively, of the closed circuit water cooling system. The above-mentioned GT13 E2M gas turbine power block draws 1.548×10$^6$ Nm$^3$/h of air through its compressor/turbine system when operating at its normal continuous rating. Standard thermodynamic calculations show that this air flow can be cooled from 35° C. to 15° C. using the above-mentioned amount of chilled water, thereby significantly increasing gas turbine, and therefore power block, efficiency and power output.

As previously mentioned, the heat recovered from the flue gas can be used to increase the power production capability of a simple cycle gas turbine power block by up to 10% or more. This extra power can be used, for example, to increase the production capacity of the aluminium smelter without the need to invest in further power plant.

It should be noted that alternatively, or additionally, chilled water produced in the above way could be used for air conditioning and cooling of buildings or districts, purposes which are highly appreciated in tropical and sub-tropical areas.

Whereas the power blocks 44 have been described above as simple cycle for illustrative purposes, they may alternatively comprise combined cycle power plants, in which waste heat from the gas turbine exhaust is used to produce steam to drive a steam turbine coupled to an electrical generator. Due to the greater thermal efficiency of combined cycles relative to a simple cycle, the flue gas heat from the connected aluminium smelters will—when recovered and utilised in an absorption chiller station as above—have a cooling capacity that is 50% in excess of the compressor air cooling requirement of the connected combined cycle power blocks. This excess cooling capacity can again be used in further plant, such as air conditioning and cooling of buildings or districts.

No matter whether simple cycle or combined cycle power blocks are used, we anticipate that the combination of the gas tube heat exchanger 10 with an absorption chiller station 24 and gas turbine air inlet coolers 40, will be economically beneficial for aluminium smelter plants in tropical and subtropical areas.

In FIG. 2, the chiller station 24 uses a bank of eight absorption-type industrial chillers, such as York Millennium™ YIA-14F3 single-effect absorption chillers, or equivalents from other manufacturers. Depending on required cooling capacity and the capabilities of the absorption chillers, fewer than eight, or more than eight, chillers could be used. To remove low temperature heat from the water at 120° C. returning from the gas coolers 10, and from the water at 25° C. returning from the air inlet heat exchangers 40, the chillers use large volumes of water. This may be sea water, since many smelters are currently being built near the coast for ease of bulk transport of the bauxite ore and the refined aluminium. 8000 m3/h of sea water entering the chiller station 24 at 30° C. will be returned to the sea at 40° C., having accomplished the required cooling of the two closed-circuit water cooling systems. As an alternative way of rejecting heat to the environment, assuming sufficiently low ambient air temperatures, one or more cooling towers may be used to cool the water that has been used in the absorption chiller as a coolant to condense the working fluid. To avoid water loss by evaporation, such cooling towers could be "dry" cooling towers, in which the water to be cooled is not directly exposed to the air passing up the tower.

Whereas the use of single-effect absorption chillers has been mentioned above, the possible use of double- or multiple-effect absorption chillers is not thereby ruled out. However, the latter two types, though more efficient than single-effect absorption chillers, require a higher-grade heat input than single-effect chillers. The grade of heat input available to the absorption chillers depends mainly on the flue gas temperature, because this controls the water inlet temperature to the absorption chillers.

If, instead of an absorption chiller station, the heat exchanger arrangement 24 simply comprises a suitable heat exchanger or bank of heat exchangers for heating process water, the heat energy recovered by the gas coolers 10 may be used in further plant requiring heat input, as in the following examples.

EXAMPLE 2

Heat extracted from the flue gas by the gas coolers 10 is used to boost the efficiency of a combined cycle power plant by pre-heating boiler water for the steam-raising part of the combined cycle.

EXAMPLE 3

Heat extracted from the flue gas by the gas coolers 10 is used to pre-heat water to be desalinated in a desalination plant.

EXAMPLE 4

Heat extracted from the flue gas by the gas coolers 10 is used to heat water for circulation around a district heating scheme.

The breadth and scope of the present invention should not be limited by any of the above-described exemplary embodiments, and modifications can be made within the scope of the invention as claimed. Each feature disclosed in the specification, including the claims and drawings, may be replaced by alternative features serving the same, equivalent or similar purposes, unless expressly stated otherwise.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. A gas cooler constructed to handle hot, raw flue gas from aluminum reduction cells in an aluminum smelter plant, comprising:
(a) a gas inlet chamber;
(b) a gas outlet chamber; and
(c) a matrix of spaced-apart, mutually parallel gas cooling tubes, each cooling tube having an inlet end projecting into the inlet chamber and an outlet end projecting into the outlet chamber, the inlet ends being bell-shaped and comprising an aerodynamically curved gas-accelerating profile effective to facilitate streamlined flow of hot raw flue gas into the cooling tubes, the projecting inlet ends being in one piece with the cooling tubes.

2. A gas cooler according to claim 1, in which the inlet chamber receives hot, raw flue gas via a diffusing inlet, whereby the gas flow is slowed and stabilized before entry to the cooling tubes.

3. A gas cooler according to claim 2, in which the diffusing inlet of the inlet chamber is configured to slow the hot flue gas in the inlet chamber to a relatively low velocity in the range of about 8-12 m/sec.

4. A gas cooler according to any claim 1, in which the cooling tube inlets accelerate the flue gas to a velocity in the range of about 20-30 m/sec.

5. A gas cooler according to claim 1, in which the inlet and outlet ends of the cooling tubes project outwardly into the inlet and outlet plenum chambers, respectively, with the projected inlet ends preventing turbulent flow of hot raw flue gas and scale.

6. A gas cooler according to claim 1, including a coolant enclosure around the cooling tubes, the enclosure being provided with coolant entry and exit ducts.

7. A gas cooler according to claim 6, in which the coolant enclosure forms part of an external shell of the gas cooler.

8. A gas cooler according to claim 6, in which the direction of flow of coolant through the coolant enclosure is counter to the direction of gas flow through the tubes.

9. A gas cooler according to claim 1, in which the inlet and outlet chambers are demountable from the coolant enclosure.

10. A gas cooler configured to receive hot, raw flue gas discharged from aluminum reduction cells in an aluminum smelter plant, comprising:
a gas inlet chamber;
a gas outlet chamber;
a plurality of spaced apart, parallel gas cooling tubes, each gas cooling tube including a first axial end, a second axial end and an inner circumferential surface extending along an entire length of the gas cooling tube, the first axial end of the gas cooling tube extending through a wall bounding the gas inlet chamber and protruding into the gas inlet chamber, the second axial end of the gas cooling tube extending through a wall bounding the gas outlet chamber and protruding into the gas outlet chamber, the first axial end of the gas cooling tube being bell-shaped so that a portion of the inner circumferential surface of the first axial end of the gas cooling tube curves outwardly, the projecting inlet ends being in one piece with the cooling tubes.

11. The gas cooler of claim 10, the gas outlet chamber including a first portion housing the second axial end of each of the gas cooling tubes and a second portion, the first portion of the gas outlet chamber possessing a larger diameter than the second portion of the gas outlet chamber.

* * * * *